US012589766B2

(12) United States Patent (10) Patent No.: US 12,589,766 B2

Jeon (45) Date of Patent: Mar. 31, 2026

(54) AUTONOMOUS DRIVING SYSTEM AND METHOD OF CONTROLLING SAME

(71) Applicant: HYUNDAI MOBIS Co., Ltd., Seoul (KR)

(72) Inventor: Byeong Hwan Jeon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 213 days.

(21) Appl. No.: 18/088,971

(22) Filed: Dec. 27, 2022

(65) Prior Publication Data

US 2023/0382418 A1      Nov. 30, 2023

(30) Foreign Application Priority Data

May 31, 2022      (KR) ........................ 10-2022-0067025

(51) Int. Cl.
*B60W 60/00* (2020.01)
*B60W 50/06* (2006.01)
*G06N 20/00* (2019.01)

(52) U.S. Cl.
CPC ............ *B60W 60/00* (2020.02); *B60W 50/06* (2013.01); *G06N 20/00* (2019.01); *B60W 2555/60* (2020.02); *B60W 2556/00* (2020.02)

(58) Field of Classification Search
CPC ........... B60W 10/20; B60W 30/18163; B60W 40/09; B60W 50/085; B60W 60/00; B60W 60/06; B60W 2556/00; B60W 2555/60; G06N 20/00; G05D 1/0088; G05D 1/0221
See application file for complete search history.

(56) References Cited

U.S. PATENT DOCUMENTS

| 11,210,559 | B1* | 12/2021 | Kolouri | ............... | G06V 10/454 |
| 2019/0258251 | A1* | 8/2019 | Ditty | .................... | G05D 1/0274 |
| 2020/0264900 | A1* | 8/2020 | Cheriton | ............ | B60W 60/0011 |
| 2020/0327416 | A1* | 10/2020 | Baker | .................... | G06N 3/044 |
| 2021/0042575 | A1* | 2/2021 | Firner | ...................... | G06N 3/04 |
| 2021/0053569 | A1* | 2/2021 | Censi | .................... | G08G 1/0112 |
| 2021/0326676 | A1* | 10/2021 | Gaidon | .................. | G06V 10/82 |

OTHER PUBLICATIONS

Ojha et al, "Backpropagation Neural Tree", publisher: Elsevier, published: Feb. 4, 2022, pp. 1-50). (Year: 2022).*

* cited by examiner

*Primary Examiner* — Wilson W Tsui

(74) *Attorney, Agent, or Firm* — MORGAN, LEWIS & BOCKIUS LLP

(57) ABSTRACT

Proposed is a method of controlling an autonomous driving system. Root learning data is generated by performing learning for raw data. A plurality of first layer learning data is generated by performing learning, to which driving environment variables of an autonomous vehicle are applied, for the root learning data. The root learning data is updated from the plurality of first layer learning data depending on whether or not an integration condition of the plurality of first layer learning data is met.

15 Claims, 7 Drawing Sheets

FIG. 5

AUTONOMOUS DRIVING SYSTEM AND METHOD OF CONTROLLING SAME

CROSS REFERENCE TO RELATED APPLICATION

The present application claims priority to Korean Patent Application No. 10-2022-0067025, filed May 31, 2022, the entire contents of which are incorporated herein for all purposes by this reference.

BACKGROUND

1. Field of the Disclosure

The present disclosure relates to an autonomous driving system that tiers learning data according to the driving environment of an autonomous vehicle and a method of controlling the same.

2. Description of the Related Art

Generally, an autonomous driving system may obtain the greatest amount of raw data as possible and normalize learning data by learning of the obtained raw data in order to improve the accuracy of an autonomous driving algorithm.

Meanwhile, a new factor for the driving environment of the autonomous vehicle is applied to the autonomous driving algorithm, the autonomous driving system may additionally obtain raw data for new driving environment and improve learning data using the additional raw data.

However, in the above-described method, whenever a new factor for the driving environment is applied to the autonomous driving algorithm, it is required to additionally obtain raw data for the new driving environment, and existing learning data disappears. Thus, there is a problem in that it is difficult to examine the history of the learning data.

In addition, in a data tree having a hierarchical structure to which a variety of variables are added, the learning data is only transferred to lower data layers. However, in general, learning results of lower layers are reflected on higher layers.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to examine a history of learning data according to the driving environment by tiering the learning data according to the driving environment of an autonomous vehicle.

The present disclosure is also intended to improve the accuracy of an autonomous driving algorithm by performing update between root learning data and layer learning data in a bidirectional manner when tiering the learning data.

The objective of the present disclosure is not limited to the aforementioned description, and other objectives not explicitly disclosed herein will be clearly understood by those skilled in in the art from the description provided hereinafter.

In order to achieve the above objective, according to one aspect of the present disclosure, there is provided a method of controlling an autonomous driving system. The method may include: generating root learning data by performing learning for raw data; generating a plurality of first layer learning data by performing learning, to which driving environment variables of an autonomous vehicle are applied, for the root learning data; and updating the root learning data from the plurality of first layer learning data depending on whether or not an integration condition of the plurality of first layer learning data is met.

Also provided is a method of controlling an autonomous driving system. The method may include: generating first learning data; generating at least one piece of second learning data corresponding to a lower layer of the first learning data by performing learning, to which driving environment variables of an autonomous vehicle are applied, for the first learning data; and updating the first learning data from the at least one piece of second learning data depending on whether or not the at least one piece of second learning data meets a predetermined first condition.

Also provided is an autonomous driving system including: a learning device generating root learning data by performing learning for raw data and generating a plurality of first layer learning data by performing learning, to which driving environment variables of an autonomous vehicle are applied, for the root learning data; and a learning control device controlling the learning performed by the learning device and updating the root learning data from the plurality of layer learning data depending on whether or not an integration condition for the plurality of layer learning data is met.

According to the present disclosure, even in the case that new factors for learning data are applied to an autonomous driving algorithm, it is possible to examine a history of learning data according to the driving environment by tiering the learning data according to the driving environment of an autonomous vehicle.

In addition, according to the present disclosure, it is possible to improve the accuracy of an autonomous driving algorithm by performing update between root learning data and layer learning data in a bidirectional manner when tiering the learning data.

The effects of the present disclosure are not limited to the aforementioned effects, and other effects not explicitly disclosed herein will be clearly understood by those skilled in in the art from the description provided hereinafter.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 5 is a diagram illustrating an example process in which the learning control device illustrated in FIG. 1 updates layer learning data from root learning data;

DETAILED DESCRIPTION OF THE DISCLOSURE

Figure 1:
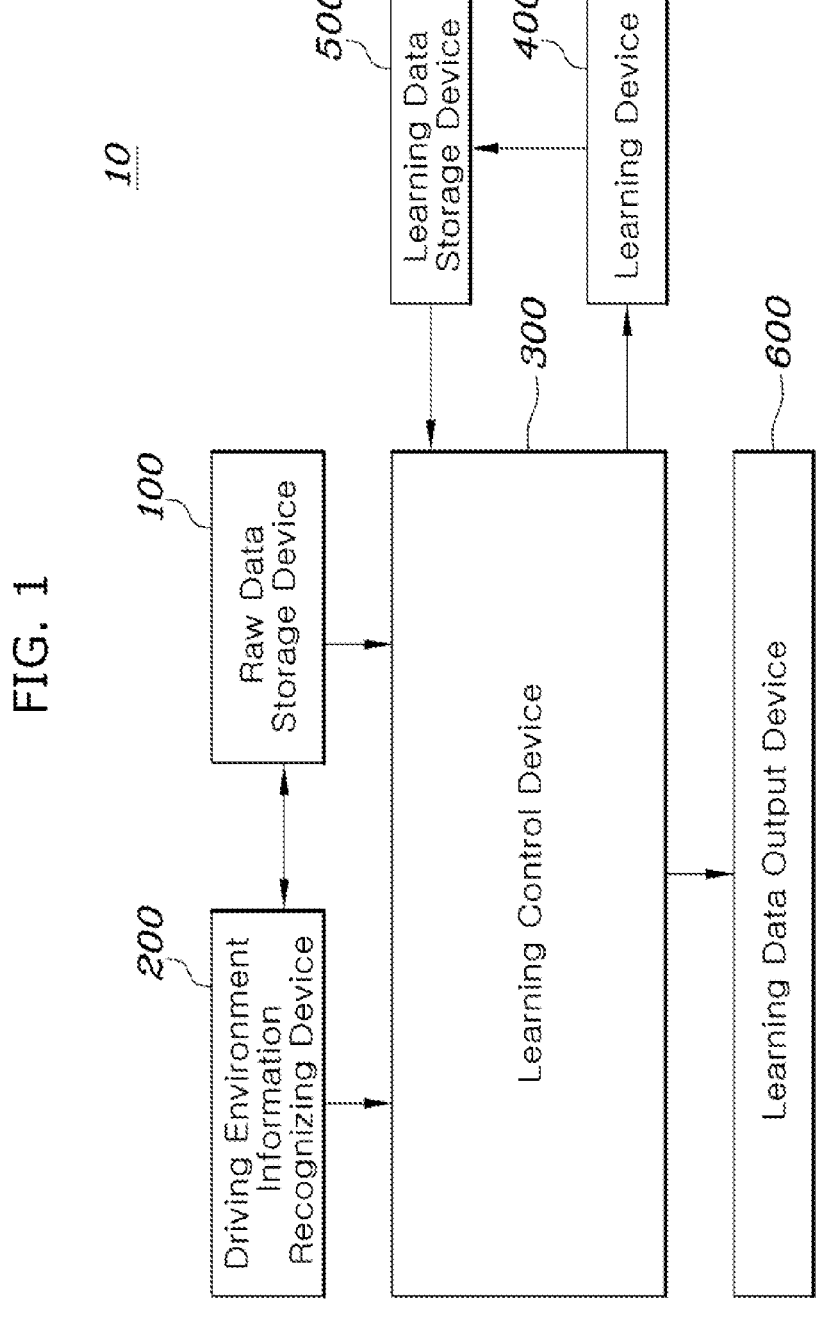
FIG. 1 is a diagram illustrating an example configuration of an autonomous driving system according to an embodiment of the present disclosure.

Hereinafter, embodiments disclosed in the present disclosure will be described in detail with reference to the accompanying drawings, in which identical or similar constituent elements are given the same reference numerals regardless of the reference numerals of the drawings, and a repeated description thereof will be omitted.

In the description of the present disclosure, when it is determined that the detailed description of the related art would obscure the gist of the present disclosure, the detailed description thereof will be omitted. In addition, the attached drawings are merely intended to be able to readily understand the embodiments disclosed herein, and thus the technical idea disclosed herein is not limited by the attached drawings, and it should be understood to include all changes, equivalents, and substitutions included in the idea and technical scope of the present disclosure.

It will be understood that, although the terms "first", "second", etc., may be used herein to describe various elements, these elements should not be limited by these terms. These terms are only used to distinguish one element from another element.

As used herein, the singular forms "a", "an", and "the" are intended to include the plural forms as well, unless the context clearly indicates otherwise.

It will be further understood that the terms "comprise", "include", "have", etc., when used in this specification, specify the presence of stated features, integers, steps, operations, elements, components, and/or combinations thereof but do not preclude the presence or addition of one or more other features, integers, steps, operations, elements, components, and/or combinations thereof.

In addition, the term "unit" or "control unit" included in names is merely a term used in naming a controller controlling specific functions of a system but should not be interpreted as a generic function unit.

FIG. 1 is a diagram illustrating an example configuration of an autonomous driving system 10 according to an embodiment of the present disclosure.

Referring to FIG. 1, the autonomous driving system 10 may include a raw data storage device 100, a driving environment information recognizing device 200, a learning control device 300, a learning device 400, a learning data storage device 500, and a learning data output device 600.

According to an exemplary embodiment of the present disclosure, the autonomous driving system 10 may include a processor (e.g., computer, microprocessor, CPU, ASIC, circuitry, logic circuits, etc.) and an associated non-transitory memory storing software instructions which, when executed by the processor, provides the functionalities of, for example, the learning control device 300 and the learning device 400. Herein, the memory and the processor may be implemented as separate semiconductor circuits. Alternatively, the memory and the processor may be implemented as a single integrated semiconductor circuit. The processor may embody one or more processor(s).

The raw data storage device 100 may receive raw data from sensors of an autonomous vehicle or sensors disposed inside traffic infrastructure (e.g., traffic lights and road signs) and store the received data. The sensors provided in the autonomous vehicle and the traffic infrastructure may be respectively implemented as an acoustic sensor, a light sensor, an electromagnetic sensor, or the like, in the form of a radar sensor, a light detection and ranging (LiDAR) sensor, a camera, a microphone, an accelerometer, a gyroscope.

The driving environment information recognizing device 200 may receive information regarding the driving environment of the autonomous vehicle and transfer the received information to the learning control device 300. Here, the driving environment of the autonomous vehicle refers to an environment related to a natural condition or a social situation directly or indirectly affecting the driving of the autonomous vehicle. For example, factors of the driving environment of the autonomous vehicle may include a country where the autonomous vehicle is driving, as well as a traffic system and an area of the country. Meanwhile, the driving environment information recognizing device 200 may recognize the driving environment of the autonomous vehicle by exchanging information with the raw data storage device 100.

The learning control device 300 may control learning performed by the learning device 400 on the basis of information regarding the driving environment, raw data, and learning data stored in the learning data storage device 500. In the present embodiment, the learning data may include root learning data and layer learning data.

The learning device 400 may generate the root learning data by performing learning for the raw data by the learning control device 300 and generate first to Nth layer learning data by performing the learning, to which driving environment variables of the autonomous vehicle are applied, for the root learning data (where 'N' is a natural number equal to or greater than 2). In the present embodiment, the driving environment variables of the autonomous vehicle may be respectively expressed in different levels.

More specifically, the learning device 400 may generate a plurality of first layer learning data corresponding to a lower layer of the root learning data by performing the learning, to which the driving environment variable of the autonomous vehicle corresponding to a first level are applied, for the root learning data. Afterwards, the learning device 400 may generate a plurality of Nth layer learning data corresponding to the lower layer of the (N−1)th layer learning data by performing the learning, to which the driving environment variable of the autonomous vehicle corresponding to the Nth level are applied, for at least one of the plurality of (N−1)th layer learning data. That is, the learning device 400 may tier the root learning data and first to Nth layer learning data into a tree structure. Thus, the autonomous driving system 10 may examine the history of the learning data according to the driving environment even in the case that new factors for the driving environment are applied to the autonomous driving algorithm.

Meanwhile, the learning device 400 may perform the learning for data input according to a machine learning algorithm. The machine learning algorithm may be implemented as at least one selected among a supervised learning algorithm, an unsupervised learning algorithm, a reinforcement learning algorithm, and combinations thereof.

The learning control device 300 may update the root learning data from the plurality of layer learning data depending on whether or not an integration condition for the plurality of layer learning data is met. Here, the integration conditions may be met when the plurality of layer learning data, generated by the learning to which the driving environment variables are applied, include common learning information. In addition, the learning control device 300 may update the first to Nth layer learning data from the root learning data depending on whether or not a propagation condition for the root learning data is met. Here, the propagation condition may be met on the basis of the accuracy of the autonomous driving algorithm according to the root learning data. That is, the learning control device 300 may update the root learning data and the layer learning data in a bidirectional manner in order to increase the accuracy of the autonomous driving algorithm. The operation of updating the learning data by the learning control device 300 will be described more specifically later with reference to FIGS. 4 and 5.

The learning data storage device 500 may store the root learning data and the layer learning data generated by the learning device 300.

The learning data output device 600 may receive the root learning data and the layer learning data from the learning control device 300 and output the root learning data and the layer learning data to a driving controller of the autonomous vehicle according to the driving environment of the autonomous vehicle.

Figure 2:
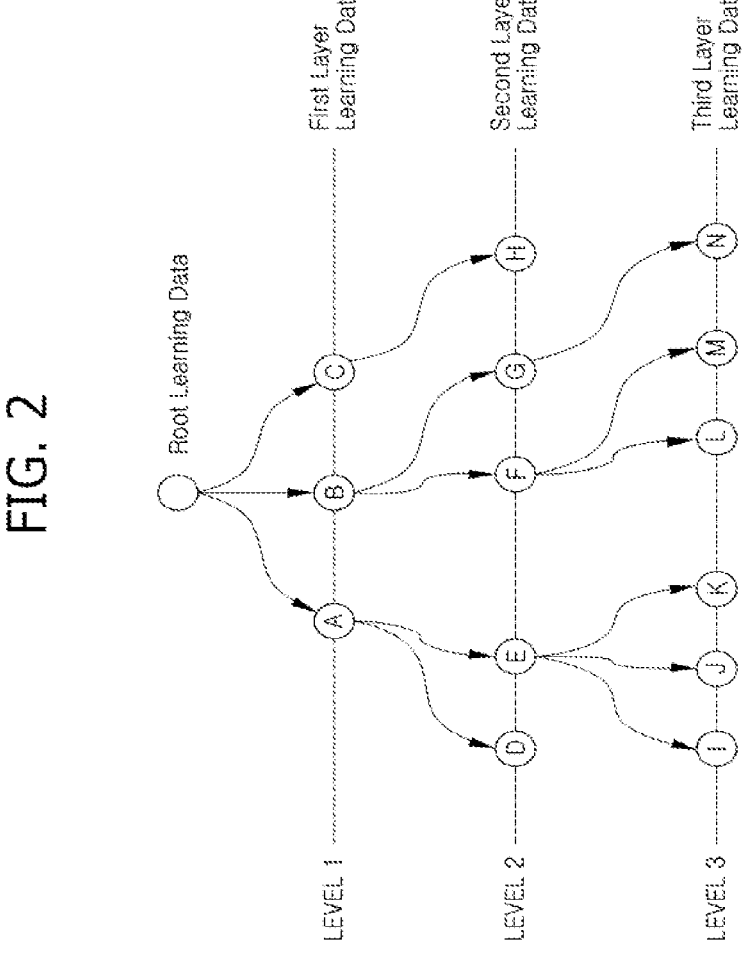
FIG. 2 is a diagram illustrating an example process of learning data tiering by the learning device illustrated in FIG. 1.

FIG. 2 is a diagram illustrating an example process of learning data tiering by the learning device 400 illustrated in FIG. 1.

Referring to FIG. 2, the learning device 400 may generate root learning data by performing learning for raw data.

Afterwards, the learning device 400 may tier the learning data by sequentially generating first layer learning data A, B, and C, second layer learning data D, E, F, G, and H, and third layer learning data I, J, K, L, M, and N by performing learning, to which the driving environment variables of the autonomous vehicle are applied, for the root learning data.

More specifically, the first layer learning data A, B, and C may be generated by performing learning, to which the driving environment variable corresponding to a first level LEVEL 1 is applied, for the root learning data, whereas the second layer learning data D, E, F, G, and H may be generated by performing learning, to which the driving environment variable corresponding to a second level LEVEL 2 is applied, for the first layer learning data A, B, and C. In addition, the third layer learning data I, J, K, L, M, and N may be generated by performing learning, to which the driving environment variable corresponding to a third level LEVEL 3 is applied, for the second layer learning data D, E, F, G, and H.

Figure 3:
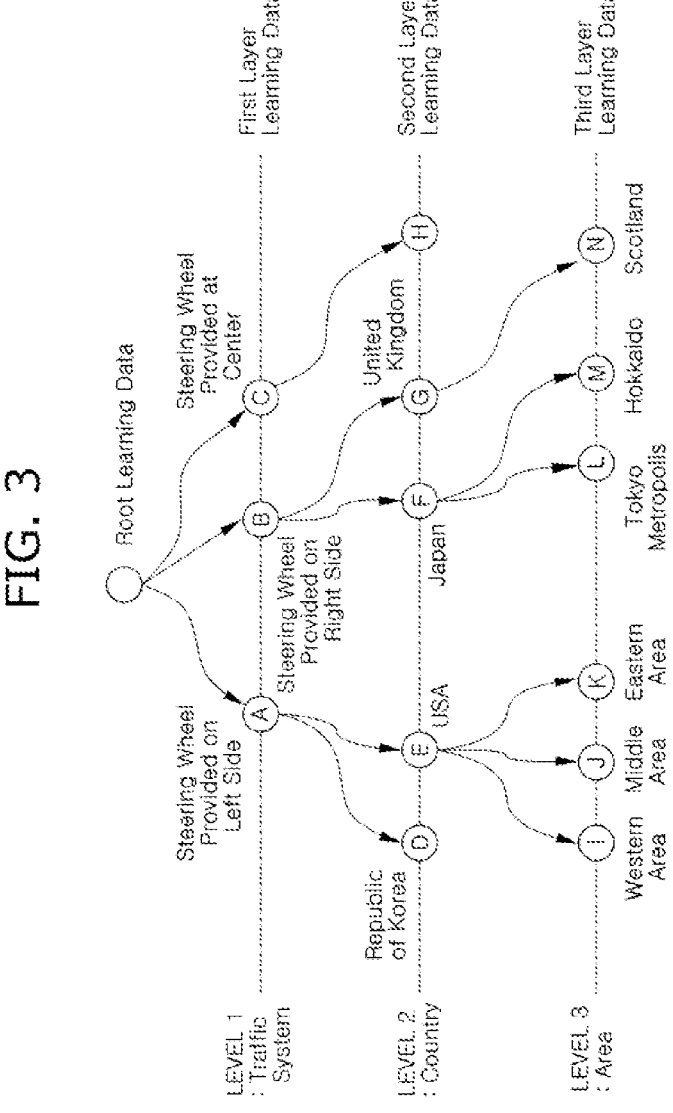
FIG. 3 is a diagram illustrating an example variable according to the driving environment of an autonomous vehicle.

FIG. 3 is a diagram illustrating an example variable according to the driving environment of an autonomous vehicle.

Referring to FIG. 1, the driving environment variable corresponding to a first level LEVEL 1 may be determined according to the traffic system of a country (e.g., a country where the steering wheel is provided on the left side, a country where the steering wheel is provided on the right side, and a country where the steering wheel is provided at the center) where the autonomous vehicle is driving. In addition, the driving environment variable corresponding to a second level LEVEL 2 may be determined according to the traffic system of a country (e.g., the Republic of Korea and the USA among countries where the steering wheel is provided on the left side and Japan and the United Kingdom among countries where the steering wheel is provided on the right side) where the autonomous vehicle is driving. Furthermore, the driving environment variable corresponding to a third level LEVEL 3 may be determined according to the area (e.g., the western, middle, and eastern areas of the USA, the Tokyo Metropolis and Hokkaido of Japan, and Scotland of the United Kingdom) of a country where the autonomous vehicle is driving.

Figure 4:
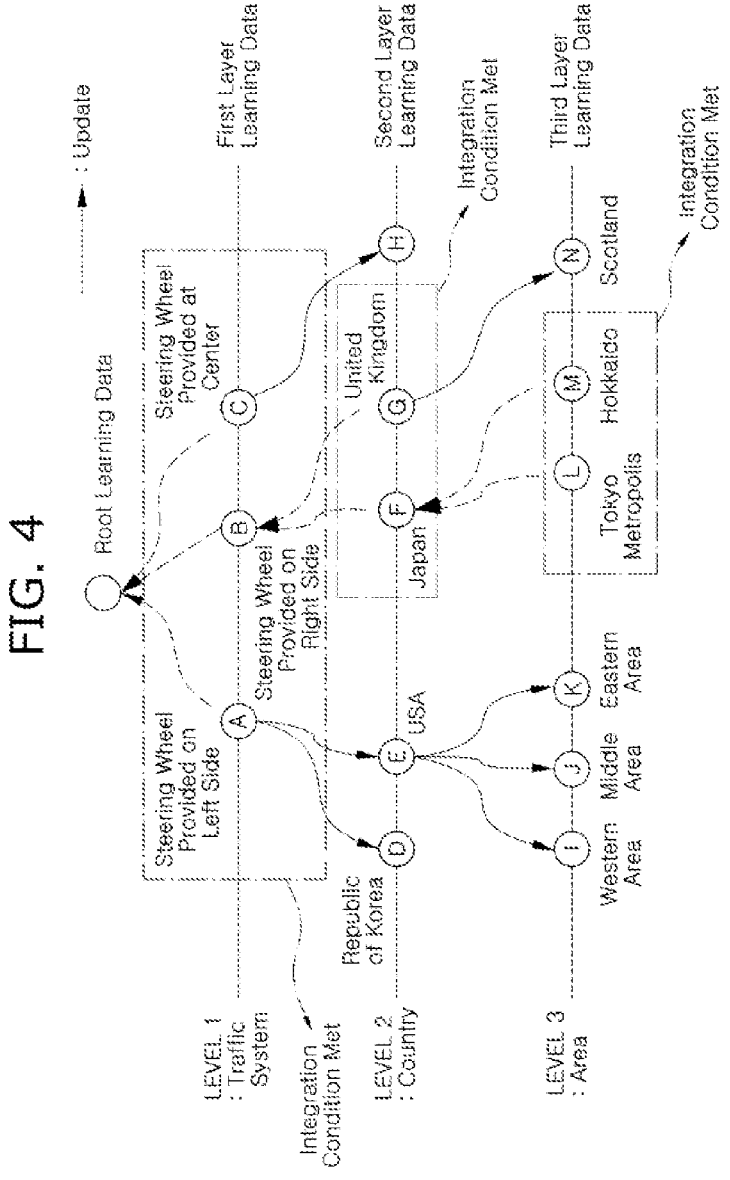
FIG. 4 is a diagram illustrating an example process in which the learning control device illustrated in FIG. 1 updates root learning data from layer learning data.

FIG. 4 is a diagram illustrating an example process in which the learning control device 300 illustrated in FIG. 1 updates root learning data from layer learning data.

Referring to FIG. 4, third layer learning data L and M regarding the Tokyo Metropolis and Hokkaido of Japan have second layer learning data F regarding Japan as a parent node, and thus are in a sibling relationship. When the third layer learning data L and M in the sibling relationship meet an integration condition, the learning control device 300 may update the second layer learning data F from the third layer learning data L and M so as to improve the accuracy of the autonomous driving algorithm regarding Japan.

In the same manner, when second layer learning data F and G in the sibling relationship meet an integration condition, the learning control device 300 may update the first layer learning data B so as to increase the accuracy of the autonomous driving algorithm regarding the country where the steering wheel is provided on the right side.

Finally, when the first layer learning data A, B, and C in the sibling relationship meet an integration condition, the learning control device 300 may update the root learning data from the first layer learning data A, B, and C so as to increase the accuracy of the autonomous driving algorithm according to the root learning data.

Figure 5:
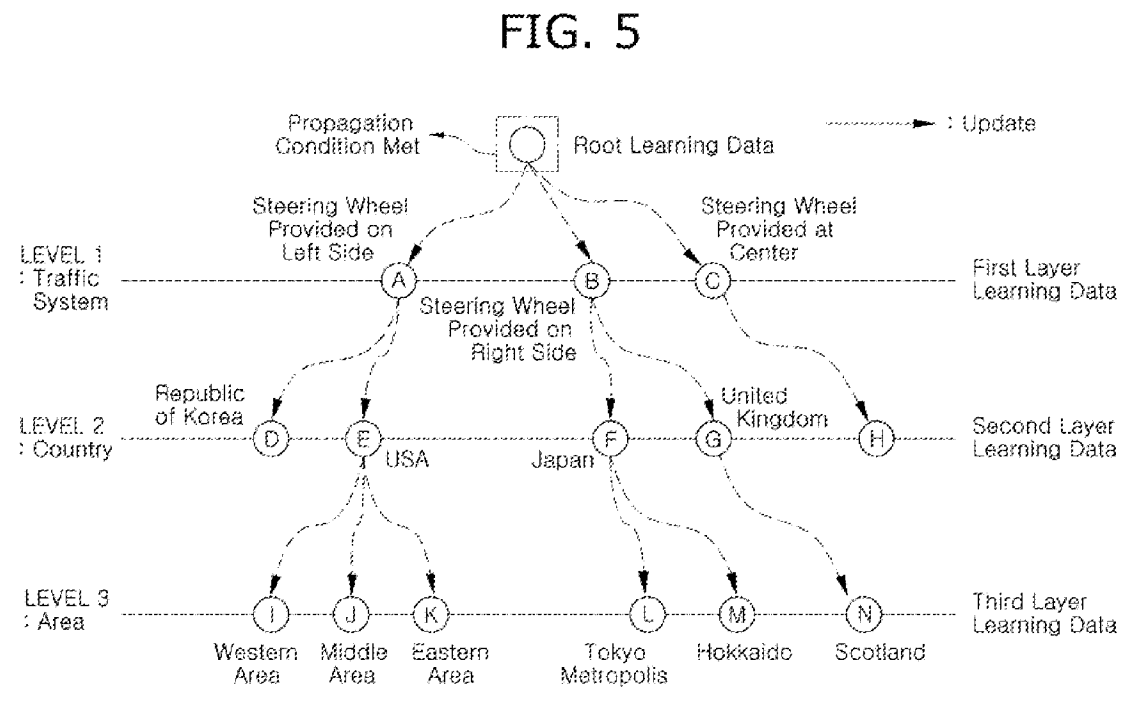

FIG. 5 is a diagram illustrating an example process in which the learning control device 300 illustrated in FIG. 1 updates layer learning data from root learning data.

Referring to 5, when the root learning data meets a propagation condition, the learning control device 300 may sequentially update the first layer learning data A, B, and C, the second layer learning data D, E, F, G, and H, and the third layer learning data I, J, K, L, M, and N from the root learning data. Thus, the autonomous driving system 10 may improve the accuracy of the algorithm according to the driving situation of the autonomous vehicle.

Figure 6:
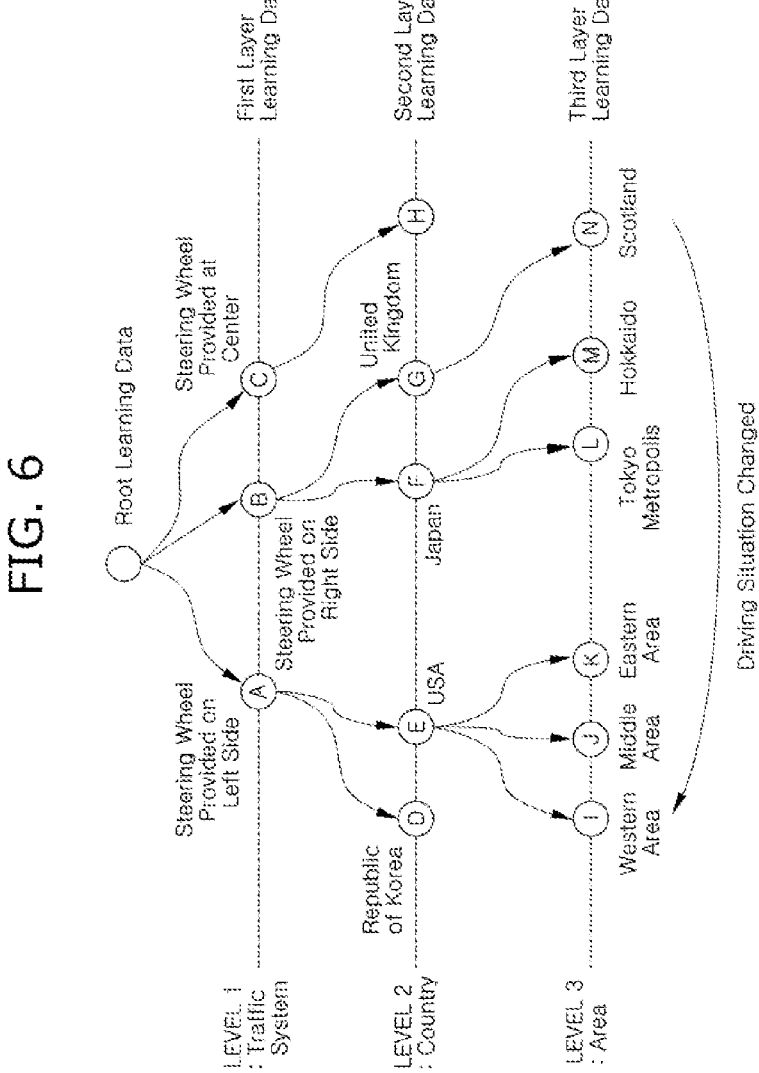
FIG. 6 is a diagram illustrating an example process in which the autonomous driving system applies driving environment variables when the driving environment of the autonomous vehicle is changed.

FIG. 6 is a diagram illustrating an example process in which the autonomous driving system applies the driving environment variable when the driving environment of the autonomous vehicle is changed.

Referring to 6, when the autonomous vehicle moves from Scotland of the United Kingdom to the eastern area of the USA, the driving environment information recognizing device 200 may transfer information regarding the driving environment to the learning control device 300, and the learning control device 300 may control the learning device 400 to perform learning to which the driving environment variable regarding the western area of the USA are applied. In addition, the learning data output device 600 may output learning data regarding the western area of the USA to the driving controller.

Although the above description has been provided with reference to FIGS. 3 to 6 by assuming a situation in which the driving environment variables are categorized according to the traffic system and geographical division, this is for illustrative purposes only. It will be apparent to those skilled in the art that a variety of driving environment variables affecting the autonomous driving may be used.

Figure 7:
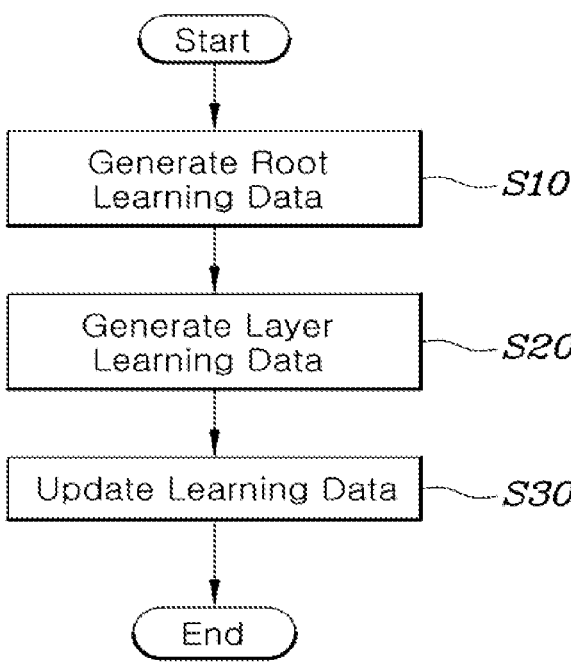
FIG. 7 is a flowchart illustrating a method of controlling the autonomous driving system according to an embodiment of the present disclosure.

FIG. 7 is a flowchart illustrating a method of controlling the autonomous driving system according to an embodiment of the present disclosure.

Referring to FIG. 7, the learning device 400 may generate root learning data by performing learning for raw data output from sensors of an autonomous vehicle by the learning control device 300 in S10.

Afterwards, the learning device 400 may generate layer learning data by performing learning, to which driving environment variables of the autonomous vehicle are applied, for the root learning data by the learning control device 300 in S20. More specifically, the learning device 400 may generate a plurality of first layer learning data by performing the learning, to which the driving environment variable corresponding to the first level is applied, for the root learning data. Afterwards, the learning device 400 performs the learning, to which the driving environment variable corresponding to the (N−1)th level is applied, for at least one of a plurality of (N−1)th layer learning data. In this manner, an operation of generating a plurality of Nth layer learning data may be performed repeatedly.

The learning control device 300 may perform update between the root learning data and the layer learning data in a bidirectional manner in S30. More specifically, when the plurality of first layer learning data meet an integration condition, the learning control device 300 may update the root learning data from the plurality of first layer learning data. Likewise, when Nth layer learning data in the sibling relationship meets the integration condition, the learning control device 300 may update at least one of the plurality of (N−1)th layer learning data from the Nth layer learning data in the sibling relationship. In addition, when the root learning data meets the propagation condition, the learning control device 300 may sequentially update the first to Nth layer learning data from the root learning data.

The present disclosure as described above may be implemented as computer-readable codes in a program recorded medium. The computer-readable media may include all types of recording devices in which data readable by a computer system is stored. Examples of the computer-readable media include hard disk drives (HDDs), solid state disks (SSDs), silicon disk drives (SDDs), read-only memory (ROM), random access memory (RAM), compact disc read-only memory (CD-ROM), magnetic tape, floppy disks, optical data storage devices, and the like. Therefore, in all aspects, the detailed description of the present disclosure is intended to be understood and interpreted as being illustrative rather than restrictive. The scope of the present disclosure shall be defined by the reasonable interpretation of the appended claims and all changes coming within the meaning and equivalency range of the appended claims are intended to be embraced within the scope of the present disclosure.

What is claimed is:

1. A method of controlling an autonomous driving system, the method comprising:

generating root learning data by performing machine learning for raw data using a machine learning algorithm;

generating a plurality of first layer learning data corresponding to a lower layer of the root learning data by applying a first-level driving environment variable of an autonomous vehicle during machine learning of the root learning data;

generating a plurality of second layer learning data corresponding to a lower layer of the first layer learning data by applying a second-level driving environment variable during machine learning of at least one of the first layer learning data;

identifying that two or more sibling nodes within the second layer learning data share common learning information, so as to determine that a first integration condition of the second layer learning data is met, and updating a first parent node of the identified two or more sibling nodes in the first layer learning data, independently of other parent-child node subsets in the first and second layer learning data; and identifying that the plurality of first layer learning data share common learning information, so as to determine that a second integration condition of the first layer learning data is met, and updating the root learning data from the plurality of first layer learning data including the first parent node, wherein the updating of the root learning data comprises updating the plurality of first layer learning data, including the first parent node, from the root learning data when the root learning data meets a propagation condition, such that the updating of the root learning data and the updating of the plurality of first layer learning data are performed bidirectionally, and wherein the method further comprises controlling the autonomous vehicle according to an autonomous driving algorithm using the updated root learning data and the updated first layer learning data.

2. The method of claim 1, wherein the raw data is output from sensors of the autonomous vehicle.

3. The method of claim 1, wherein the second integration condition of the plurality of first layer learning data is met when the plurality of first layer learning data includes the common learning information.

4. The method of claim 1, wherein the first-level driving environment variable is determined according to a traffic system of a country where the autonomous vehicle is driving.

5. The method of claim 4, wherein the second-level driving environment variable is determined according to the country where the autonomous vehicle is driving.

6. The method of claim 5, wherein the generation of the first layer learning data comprises generating a plurality of third layer learning data by performing machine learning of at least one among the plurality of second layer learning data by applying a third-level driving environment variable thereto, wherein the third-level driving environment variable is determined according to an area of the country where the autonomous vehicle is driving.

7. A method of controlling an autonomous driving system, the method comprising:

generating first learning data;

generating second learning data corresponding to a lower layer of the first learning data by performing machine learning of the first learning data using a machine learning algorithm by applying driving environment variables of an autonomous vehicle thereto; and updating the first learning data from the second learning data when the second learning data meets a predetermined first condition, wherein the updating of the first learning data comprises identifying that two or more sibling nodes within the second learning data share common learning information, so as to determine that the predetermined first condition of the second learning data is met, and updating a first parent node of the identified two or more sibling nodes in the first learning data, independently of other parent-child node subsets in the first and second learning data, and wherein the updating of the first learning data further comprises updating the second learning data from the first learning data, including the first parent node, when the first learning data meets a predetermined second condition, such that the updating of the first learning data and the updating of the second learning data are performed bidirectionally, and wherein the method further comprises controlling the autonomous vehicle according to an autonomous driving algorithm using the updated first and second learning data.

8. The method of claim 7, wherein the first learning data is generated by performing machine learning for raw data output from sensors of the autonomous vehicle.

9. The method of claim 7, wherein the second learning data comprises a plurality of second learning data, and the predetermined first condition is met when the plurality of second learning data includes the common learning information.

10. An autonomous driving system comprises:

a learning device generating root learning data by performing machine learning for raw data using a machine learning algorithm and generating a plurality of first layer learning data corresponding to a lower layer of the root learning data by performing machine learning of the generated root learning data by applying driving environment variables of an autonomous vehicle thereto; and a learning control device controlling the learning performed by the learning device and updating the root learning data from the plurality of first layer learning data when a first integration condition for the plurality of first layer learning data is met, wherein the learning device generates the plurality of first layer learning data by applying a first-level driving environment variable among the driving environment variables of the autonomous vehicle during machine learning of the root learning data, wherein the learning device generates a plurality of second layer learning data by applying a second-level driving environment variable during machine learning of at least one of the first layer learning data, wherein the learning control device identifies that two or more sibling nodes within the second layer learning data share common learning information, so as to determine that a second integration condition of the second layer learning data is met, and updates a first parent node of the identified two or more sibling nodes in the first layer learning data, independently of other parent-child node subsets in the first and second layer learning data, wherein the learning control device identifies that the plurality of first layer learning data share common learning information, so as to determine that the first integration condition of the first layer learning data is met, and updates the root learning data from the plurality of first layer learning data including the first parent node, wherein the learning control device updates the plurality of first layer learning data, including the first parent node, from the root learning data when the root learning data meets a propagation condition, such that the updating of the root learning data and the updating of the plurality of first layer learning data are performed bidirectionally, and wherein the autonomous vehicle is controlled according to an autonomous driving algorithm using the updated root learning data and the updated first layer learning data.

11. The autonomous driving system of claim 10, further comprising a raw data storage device receiving the raw data from sensors of the autonomous vehicle and storing the raw data.

12. The autonomous driving system of claim 10, wherein the first integration condition of the plurality of first layer learning data is met when the plurality of first layer learning data includes the common learning information.

13. The autonomous driving system of claim 10, wherein the first-level driving environment variable is determined according to a traffic system of a country where the autonomous vehicle is driving.

14. The autonomous driving system of claim 13, wherein the second-level driving environment variable is determined according to the country where the autonomous vehicle is driving.

15. The autonomous driving system of claim 14, wherein the learning device generates a plurality of third layer learning data by performing machine learning of at least one among the plurality of second layer learning data by applying a third-level driving environment variable thereto, wherein the third-level driving environment variable is determined according to an area of the country where the autonomous vehicle is driving.

\* \* \* \* \*